US010316494B2

(12) United States Patent
Tada et al.

(10) Patent No.: US 10,316,494 B2
(45) Date of Patent: Jun. 11, 2019

(54) WORKING MACHINE

(71) Applicant: Caterpillar SARL, Geneva (CH)

(72) Inventors: Shogo Tada, Tokyo (JP); Masafumi Ohkubo, Tokyo (JP); Yozo Nakamoto, Tokyo (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 15/031,078

(22) PCT Filed: Nov. 3, 2014

(86) PCT No.: PCT/EP2014/073608
§ 371 (c)(1),
(2) Date: Apr. 21, 2016

(87) PCT Pub. No.: WO2015/067568
PCT Pub. Date: May 14, 2015

(65) Prior Publication Data

US 2016/0237653 A1 Aug. 18, 2016

(30) Foreign Application Priority Data

Nov. 5, 2013 (JP) ................................ 2013-229269

(51) Int. Cl.
*G06F 7/70* (2006.01)
*E02F 9/22* (2006.01)
(Continued)

(52) U.S. Cl.
CPC .......... *E02F 9/2246* (2013.01); *E02F 9/2066* (2013.01); *E02F 9/2232* (2013.01);
(Continued)

(58) Field of Classification Search
CPC ...... B60W 10/06; B60W 10/08; B60W 20/00; B60W 2710/0644; B60W 10/30;
(Continued)

(56) References Cited

U.S. PATENT DOCUMENTS 5,967,756 A 10/1999 Devier et al.
2006/0229786 A1* 10/2006 Sawada ................ E02F 9/2235 701/50
(Continued)

FOREIGN PATENT DOCUMENTS

EP 1947316 A1 7/2008
GB 2417793 A 3/2006
(Continued)

OTHER PUBLICATIONS

JP 10088621 A—Abstract, Apr. 7, 1998 (Year: 1998).*
(Continued)

*Primary Examiner* — Shardul D Patel

(57) ABSTRACT

A work machine has a work device mounted on a machine body including a fluid pressure motor for travelling. A controller reduces engine speed to be lower than rated engine speed during normal working mode. The controller controls engine speed so as to obtain a pump flow rate in accordance with a target travelling speed during travelling low-load mode when engine load is lower than a threshold. The controller controls both the engine speed and output torque for pump control so that the engine output becomes maximum in travelling high-load mode when the engine load is higher than the threshold.

12 Claims, 5 Drawing Sheets

(51) Int. Cl.

| | |
|---|---|
| ***F02D 29/04*** | (2006.01) |
| ***E02F 9/20*** | (2006.01) |
| ***F02D 41/04*** | (2006.01) |
| *E02F 3/32* | (2006.01) |

(52) U.S. Cl.
CPC .......... *E02F 9/2292* (2013.01); *E02F 9/2296* (2013.01); *F02D 29/04* (2013.01); *F02D 41/04* (2013.01); *E02F 3/32* (2013.01); *F02D 2200/50* (2013.01)

(58) Field of Classification Search
CPC ............. B60W 20/10; B60W 2300/17; B60W 2510/244; B60W 2510/305; B60W 2600/00; B60W 30/1882; B60W 10/02; B60W 10/103; B60W 10/11; B60W 10/182; B60W 20/15; B60W 20/19; B60W 20/40; B60W 2300/152; B60W 2510/06; B60W 2510/0638; B60W 2510/0657; B60W 2510/246; B60W 2520/10; B60W 2710/0677; B60W 2710/083; B60W 2710/105; B60W 30/18045; E02F 9/2246; E02F 9/2296; E02F 9/2075; E02F 9/2285; E02F 9/2235; E02F 9/2292; E02F 9/20; E02F 9/2079; E02F 9/2083; E02F 9/2095; E02F 9/226; E02F 9/2282; E02F 9/2025; E02F 9/2066; E02F 9/207; E02F 9/2091; E02F 9/22; E02F 9/2253; E02F 9/2289; E02F 9/267; E02F 9/2232; E02F 3/32; F02D 29/04; F02D 41/021; F02D 2200/604; F02D 29/06; F02D 31/001; F02D 2041/228; F02D 2200/0812; F02D 2250/18; F02D 31/007; F02D 41/029; F02D 41/1497; F02D 11/105; F02D 2200/021; F02D 2200/101; F02D 29/00; F02D 29/02; F02D 41/00; F02D 41/0205; F02D 41/2422; F02D 41/04; F02D 2200/50; B60L 11/005; B60L 11/123; B60L 2200/40; B60L 2210/40; B60L 2240/421; B60L 7/14; B60L 11/126; B60L 11/14; B60L 11/1859; B60L 11/1862; B60L 15/20; B60L 15/2009; B60L 2200/42; B60L 2210/30; B60L 2240/423; B60L 2240/441; B60L 2240/526; B60L 2240/527; B60L 2240/529; B60L 2240/547; B60L 2250/26; B60L 3/0046; B60L 3/06; B60L 7/18
USPC .............................................................. 701/50
See application file for complete search history.

(56) References Cited

U.S. PATENT DOCUMENTS

| | | | | |
|---|---|---|---|---|
| 2009/0101107 | A1* | 4/2009 | Kondou .................... | E02F 9/20 123/349 |
| 2010/0235060 | A1* | 9/2010 | Yamada ................ | E02F 9/2246 701/50 |
| 2014/0054902 | A1* | 2/2014 | Kawaguchi ........... | F02D 41/021 290/40 B |
| 2015/0315766 | A1* | 11/2015 | Take ................... | F02D 41/0205 701/22 |
| 2016/0237653 | A1* | 8/2016 | Tada ....................... | F02D 41/04 |

FOREIGN PATENT DOCUMENTS

| | | | | |
|---|---|---|---|---|
| GB | 2467056 | A | | 7/2010 |
| JP | 1172088 | A1 | | 7/1989 |
| JP | 10-088621 | A | | 4/1998 |
| JP | 10088621 | A | * | 4/1998 |
| JP | 2007-255414 | A | | 10/2007 |
| JP | 2009-074406 | A | | 4/2009 |
| JP | 2010-095967 | A | | 4/2010 |
| JP | 2011-157931 | A | | 8/2011 |
| WO | 2007052658 | A | | 5/2007 |
| WO | 2009063700 | A | | 5/2009 |

OTHER PUBLICATIONS

European Patent Office, International Search Report in International Patent Application No. PCT/EP2014/073608, dated Jan. 21, 2015, 3 pp.

* cited by examiner

WORKING MACHINE

CROSS-REFERENCE TO RELATED APPLICATIONS

This application is a national phase application of International Patent Application No. PCT/EP2014/073608, filed Nov. 3, 2014, which claims priority to Japanese Patent Application No, 2013-229269, filed Nov. 5, 2013, both of which are incorporated by reference herein in their entireties for all purposes.

TECHNICAL FIELD

The present invention relates to a working machine having a traveling hydraulic pressure motor.

BACKGROUND ART

In recent years, energy saving (reduction in fuel consumption) has become an important issue in working machines. Moreover, in excavators, it is requested to suppress an engine rotation speed as low as possible in an idling mode or during an excavation operation (normal operation) in a relatively light load.

Here, merely lowering a rated engine rotation speed itself is not possible when traveling performance needs to be ensured. That is, if the rated engine rotation speed is decreased, a maximum pump flow rate decreases to decrease a traveling speed, and a maximum engine output decreases to decrease traveling ability under power-demanding conditions such as on slope land.

Thus, there is a demand for a controller capable of reducing an engine rotation speed during a normal operation state and securing a traveling speed and traveling power.

From such a viewpoint, as a technique of easily realizing low fuel consumption and low noise during an excavation operation while securing traveling performance, an excavator engine controller in which engine rotation speed control means selects isochronous control when a traveling state is detected and selects droop control when the traveling state is not detected so that an engine rotation speed during an operation is lower than the engine rotation speed (rated engine rotation speed) during traveling is disclosed (see Patent Literature 1).

Further, an engine controller is disclosed in which, when the input from travel operation means is detected, a second target rotation speed which is a predetermined target engine rotation speed during traveling is compared with a first target rotation speed which is a minimum engine rotation speed at which a target pump discharge flow rate is realized with maximum pump displacement and the engine rotation speed is controlled by selecting the larger target rotation speed, that is, the smaller engine rotation speed is selected when a machine is not traveling (see Patent Literature 2).

Further, as an engine controller capable of controlling driving of an engine efficiently with low fuel consumption, an engine controller which detects an operation state of a lever with pilot pressure, detects the type and combination of hydraulic actuators operated from the operation state, applies a target engine rotation speed (upper limit) set in advance individually according to the type and combination, and sets an upper limit of an engine rotation speed in a travel-only mode so as to be higher than the lower limit of the engine rotation speed is disclosed (see Patent Literature 3).

Patent Literature 1: Japanese Patent Application Publication No. 2007-255414

Patent Literature 2: Japanese Patent Application Publication No. 2009-074406

Patent Literature 3: Japanese Patent Application Publication No.2011-157931

As described above, although techniques of implementing change of an engine rotation speed between during operations and during traveling have been known in the art, the conventional engine controllers cannot deal with power-demanding traveling conditions such as on slope land or during spin-turning.

DISCLOSURE OF THE INVENTION

The present invention has been made in view of such a problem, and an object thereof is to provide a working machine capable of reducing fuel consumption during a normal operation state and securing traveling speed and power under severe traveling conditions.

An invention according to claim 1 is a working machine including: a vehicle body that includes a traveling hydraulic pressure motor and travels using the traveling hydraulic pressure motor; a working unit that includes a working hydraulic pressure actuator and is mounted on the vehicle body operated by the working hydraulic pressure actuator; an engine that is mounted on the vehicle body; a variable displacement hydraulic pressure pump that is driven by the engine so as to supply an operating fluid to the traveling hydraulic pressure motor and the working hydraulic pressure actuator; and a controller that decreases an engine rotation speed to be lower than a rated rotation speed during a normal operation state in a state where the traveling hydraulic pressure motor is stopped, that controls the engine rotation speed so that a pump flow rate is adjusted corresponding to a target traveling speed during a light load state where an engine load generated when operating the traveling hydraulic pressure motor is lower than a threshold, and that controls the engine rotation speed and a pump control output torque so that engine output power is increased from that during the normal operation state and the light load, during a heavy load state where the engine load is higher than the threshold.

An invention according to claim 2 is the working machine according to claim 1, in which the controller has: a normal operation mode where during the normal operation state, a normal operation mode engine rotation speed, which is lower than the rated rotation speed, is selected as an engine rotation speed command value and a normal torque is selected as a target pump control torque; a light load traveling mode where during the light load state, a light load traveling mode engine rotation speed, which is different from the normal operation mode engine rotation speed, is selected as the engine rotation speed command value and the normal torque is selected as the target pump control torque; and a heavy load traveling mode where during the heavy load state, a heavy load traveling mode engine rotation speed, which is higher than the normal operation mode engine rotation speed, is selected as the engine rotation speed command value and a torque increased from the normal torque of the normal operation mode and the light load traveling mode is selected as the target pump control torque.

An invention according to claim 3 is the working machine according to claim 1 or 2, in which the traveling hydraulic pressure motor is provided on each of left and right sides of the vehicle body, a plurality of variable displacement hydraulic pressure pumps are provided so as to correspond to these traveling hydraulic pressure motors and include a pump swash plate as displacement varying means, and the controller maintains a pump swash plate of each hydraulic pressure pump during traveling at a maximum swash angle and variably controls the engine rotation speed.

An invention according to claim 4 is the working machine according to claim 2 or 3, in which the controller has: a first threshold for changing the engine rotation speed from a light load traveling mode engine rotation speed to a heavy load traveling mode engine rotation speed when the engine load during traveling increases; and a second threshold, which is lower than the first threshold, for controlling to return the engine rotation speed from the heavy load traveling mode engine rotation speed to the light load traveling mode engine rotation speed when the engine load decreases.

An invention according to claim 5 is the working machine according to any one of claims 1 to 4, in which the engine load is determined based on at least one measured amounts of a pump load pressure discharged from the hydraulic pressure pump, a traveling load pressure applied to the traveling hydraulic pressure motor, a fuel discharge amount of the engine, and a cylinder internal pressure of the engine, or the fuel discharge amount and the rotation speed of the engine.

According to the invention disclosed in claim 1, in the working machine in which the working unit operated by the working hydraulic pressure actuator is mounted on the vehicle body having the traveling hydraulic pressure motor, the controller decreases the engine rotation speed to be lower than the rated rotation speed during the normal operation state, controls the engine rotation speed so that the pump flow rate is adjusted so as to correspond to the target traveling speed during the light load state, and controls the engine rotation speed and the pump control output torque so that the engine output power is increased from that of during the normal operation state and the light load state during the heavy lead state. Thus, during the normal operation state, it is possible to reduce the fuel consumption by decreasing the engine rotation speed. During the light load state, it is possible to secure a predetermined traveling speed by adjusting the pump flow rate so as to correspond to the target traveling speed. Further, during the heavy load state, the engine rotation speed and the pump control output torque are controlled so that the engine output power is increased from that during the normal operation state and the light load state. Therefore, it is possible to secure the traveling speed and the output power under severe traveling conditions such as during traveling on slope lane or during spin-turning. As a result, it is possible to reduce the fuel consumption during the normal operation state of the working machine and to secure the traveling speed and the output power under severe traveling conditions.

According to the invention disclosed in claim 2, the normal operation mode during the normal operation state where the vehicle stops traveling, the light load traveling mode during the light load state, and the heavy load traveling mode during the heavy load state are selected, and different combinations of the engine rotation speed and the target pump control torque are selected for respective modes. Thus, the control ideal for each mode can be performed easily.

According to the invention disclosed in claim 3, the controller variably controls the engine rotation speed while maintaining the pump swash plates of the plurality of hydraulic pressure pumps provided so as to correspond to the traveling hydraulic pressure motors on both left and right sides of the vehicle body to the maximum swash angle. Thus, it is possible to control the pump flow rates discharged from the respective hydraulic pressure pumps appropriately. Since the pump swash plates of the respective hydraulic pressure pumps are maintained to the maximum swash angle, it is possible to improve the pumping efficiency. Further, since a state where the pump swash plates reach their physical limits is created, a difference between the pump flow rates of two variable displacement pumps occurs rarely, and the ability to travel straight can be secured.

According to the invention disclosed in claim 4, with switching of an engine rotation speed being implemented between the rising period and the falling period of the pump load pressure along a hysteresis curve on the basis of two steps of first and second thresholds, it is possible to prevent oscillatory behavior of the engine rotation speed and to improve stability of control.

According to the invention disclosed in claim 5, it is possible to select an output torque calculated from at least one of the measured amounts that can be detected by sensors provided in an existing working machine among the pump load pressure, the traveling load pressure, the fuel discharge amount of the engine, and the cylinder internal pressure of the engine, or the fuel discharge amount and the rotation speed of the engine that can be detected by sensors provided in an existing working machine and to determine the engine load based on the output torque.

BEST MODE FOR CARRYING OUT THE INVENTION

Hereinafter, the present invention will be described in detail according to an embodiment illustrated in FIGS. 1 to 6.

In this embodiment, a case where engine rotation speeds are set such that (normal operation mode engine rotation speed)<(light load traveling mode engine rotation speed)<(heavy load traveling mode engine rotation speed) is described by way of an example. However, the engine rotation speeds are not necessarily set such that the light load traveling mode engine rotation speed is between the normal operation mode engine rotation speed and the heavy load traveling mode engine rotation speed. The engine rotation speeds may be set such that (light load traveling mode engine rotation speed)≤(normal operation mode engine rotation speed)<(heavy load traveling mode engine rotation speed) or that (normal operation mode engine rotation speed)<(heavy load traveling mode engine rotation speed)≤(light load traveling mode engine rotation speed). However, description of these cases is not provided.

Engine rotation speeds may be set such that (normal operation mode engine rotation speed)<(light load traveling mode engine rotation speed) when a pump flow rate is prioritized and that (normal operation mode engine rotation speed)<(heavy load traveling mode engine rotation speed) when engine output power is prioritized.

Figure 5:
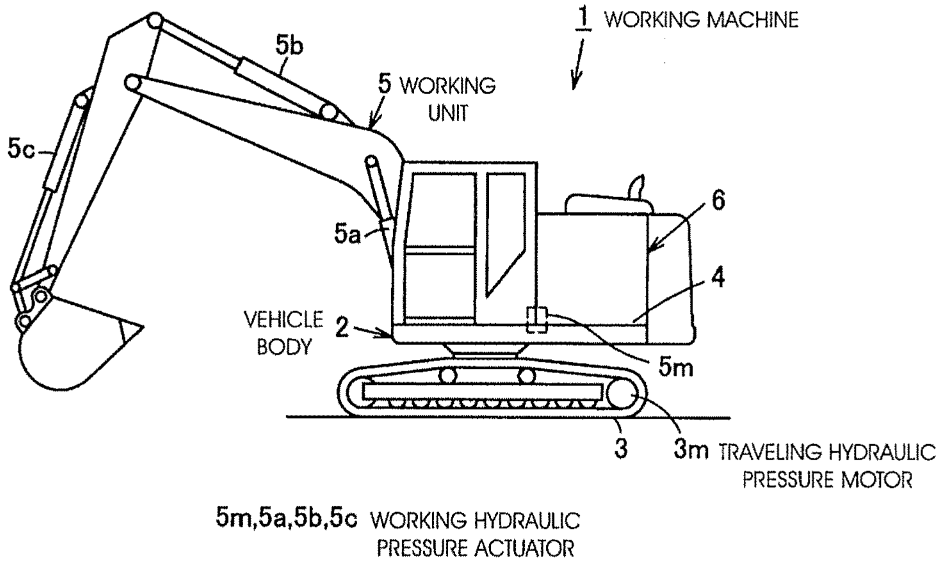
FIG. 5 is a side view of the working machine.

FIG. 5 illustrates an excavator 1 as a working machine, and a vehicle body 2 of the excavator 1 has a configuration in which an upper slewing body 4 is rotatably provided on a lower traveling body 3 movable by traveling hydraulic pressure motors (hereinafter referred to as traveling motors 3*m*) provided on both left and right sides of the vehicle body 2, and a working unit 5 is mounted on the upper slewing body 4.

An engine and pump unit 6 that supplies operating oil to hydraulic actuators (the traveling motor 3*m*, a slewing motor 5*m*, a boom cylinder 5*a*, a stick cylinder 5*b*, and a bucket cylinder 5*c*) that drive the vehicle body 2 and the working unit 5 is mounted on the vehicle body 2. The slewing motor 5*m*, the boom cylinder 5*a*, the stick cylinder 5*b*, and the bucket cylinder 5*c* are working hydraulic actuators 5*m*, 5*a*, 5*b*, and 5*c* as working hydraulic pressure actuators.

Figure 6:
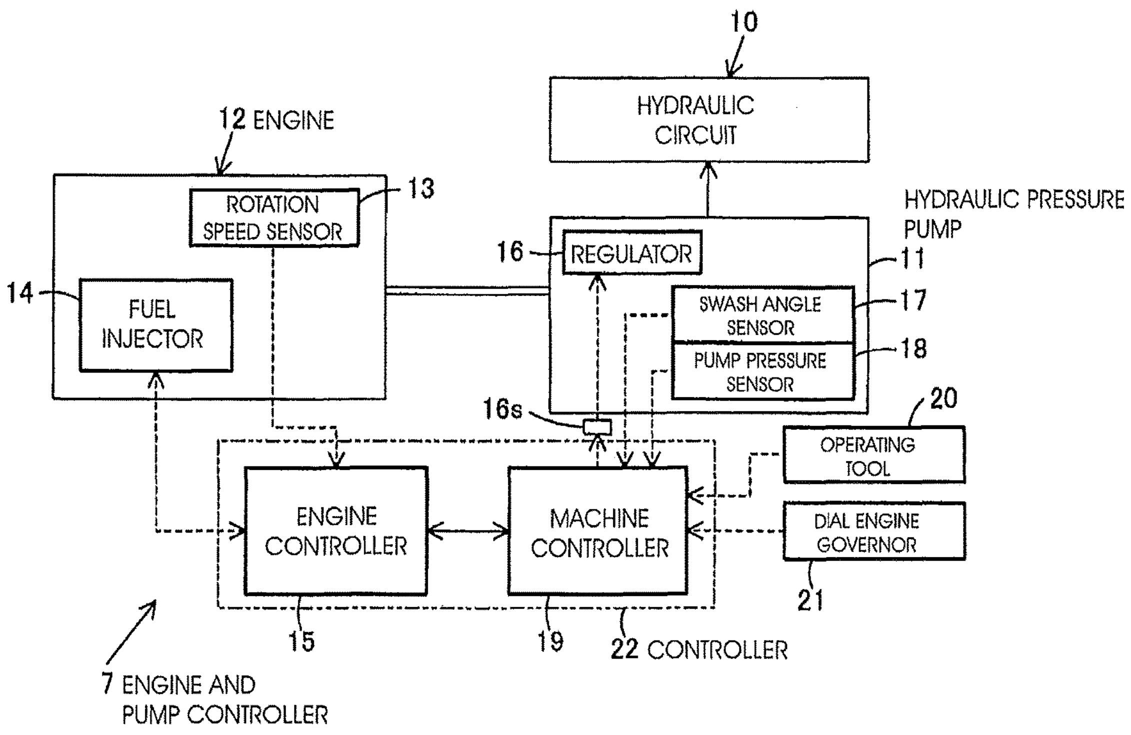
FIG. 6 is a block diagram illustrating a configuration example associated with the engine control.

FIG. 6 illustrates a schematic configuration of an engine and pump controller 7 that controls the engine and pump unit 6. The engine and pump controller 7 controls a displacement (swash angle) of a variable displacement hydraulic pressure pump (hereinafter referred to as a variable displacement pump 11) that supplies operating oil as operating fluid to a hydraulic circuit 10 such as a control valve that controls the hydraulic actuators (the traveling motor 3*m* and the like) and controls an engine rotation speed (engine speed) and engine output power of an engine 12 that drives the variable displacement pump 11. Two variable displacement pumps 11 are provided so as to correspond to the traveling motors 3*m* on the left and right sides of the vehicle body.

The engine 12 includes a rotation speed sensor 13 that detects an engine rotation speed and a fuel injector 14 that controls fuel injection pressure, a fuel injection point in time (timing), and a fuel injection amount (period). The rotation speed sensor 13 and the fuel injector 14 are connected to an engine controller 15 for fuel injection control. The fuel injector 14 includes an electronic governor or the like for setting engine rotation speeds.

The variable displacement pump 11 includes a pump regulator 16 that includes a pump swash plate as pump displacement varying means and controls a tilt angle (hereinafter referred to as a swash angle) of the pump swash plate indirectly with the aid of an electromagnetic proportional valve 16*s* or directly without the aid of the electromagnetic proportional valve 16*s*, a swash angle sensor that detects the swash angle controlled by the pump regulator 16 as a pump displacement control position, and a pump pressure sensor 18 as load pressure detecting means for detecting pump load pressure (that is, pump discharge pressure) used for determination of an engine load. The swash angle sensor 17 and the pump pressure sensor 18 are connected to a machine controller 19.

The pump pressure sensor 18 as the load pressure detector detects working load pressure as pump load pressure during operations in a non-traveling state and detects the larger one of traveling load pressure and working load pressure applied to the traveling motor 3*m* as the pump load pressure during traveling and provides data used when determining whether a present control mode is a light load traveling mode or a heavy load traveling mode described later. A pressure sensor may detect high-pressure-side pressure on a traveling hydraulic circuit as the traveling load pressure.

Moreover, as parameters for determining an engine load, at least one of the measured amounts such as traveling load pressure applied to the traveling motor 3*m* (when working load pressure is small only), a fuel discharge amount of the engine 12, and cylinder internal pressure of the engine 12 or an output torque calculated from the fuel discharge amount and the rotation speed of the engine 12 in addition to the pump load pressure discharged from the variable displacement pump 11 may be used. These parameters are measured amounts that can be detected by the sensors provided in an existing working machine or state amounts (the output torque) that can be calculated from the measured amounts detected by the sensors provided in a working machine. The engine load can be determined based on the measured amounts or state amounts.

A lever or pedal-type operating tool 20 operated by an operator of the excavator 1 and a dial engine governor (dial accelerator) 21 as engine rotation speed setting means are connected to the machine controller 19.

The operating tool 20 is a joystick or a remote control valve. A joystick-type operating tool controls a control valve of the hydraulic circuit 10 according to an operation amount indirectly with the aid of an electromagnetic proportional valve according to pilot control, and a remote control valve-type operating tool directly controls the control valve of the hydraulic circuit 10 according to the operation amount. The operation amounts (including the presence of operations) of various hydraulic actuators are converted into electrical signals and are input to the machine controller 19.

The dial engine governor 21 has multi-step dial values and can select a predetermined engine rotation speed for each dial value, which includes a normal operation mode engine rotation speed, a light load traveling mode engine rotation speed, a heavy load traveling mode engine rotation speed, and the like described later.

The engine controller 15 and the machine controller 19 are connected and exchange information with each other. The engine controller 15 and machine controller 19 will be referred to as a controller 22.

The controller 22 has a normal operation mode during a normal operation state, a light load traveling mode during a light load state, and a heavy load traveling mode during a heavy load state.

In the normal operation mode, a normal operation mode engine rotation speed lower than a rated rotation speed is selected as an engine rotation speed command value, and a normal torque is selected as a target pump control torque.

In the light load traveling mode, a light load traveling mode engine rotation speed different from the normal operation mode engine rotation speed is selected as the engine rotation speed command value, and a normal torque is selected as the target pump control torque.

In the heavy load traveling mode, a heavy load traveling mode engine rotation speed higher (or different from the normal operation mode engine rotation speed and the light load traveling mode engine rotation speed) than the normal operation mode engine rotation speed is selected as the engine rotation speed command value, and a torque increased from the normal torque in the normal operation mode and the light load traveling mode is selected as the target pump control torque.

The engine and pump controller 7 has a function of controlling the engine rotation speed and output power of the engine 12 with the aid of the engine controller 15 and the fuel injector 14 based on an engine rotation speed command value and a torque command value determined based on a travel operation state of the operating tool 20, the dial value of the dial engine governor 21, and the pump load pressure state detected by the pump pressure sensor 18, adjusting the pump regulator 16 of the variable displacement pump 11 with the aid of an electromagnetic proportional valve (not illustrated) according to an electrical signal output from the machine controller 19, and controlling the output and the upper limit output of the variable displacement pump 11.

Figure 1:
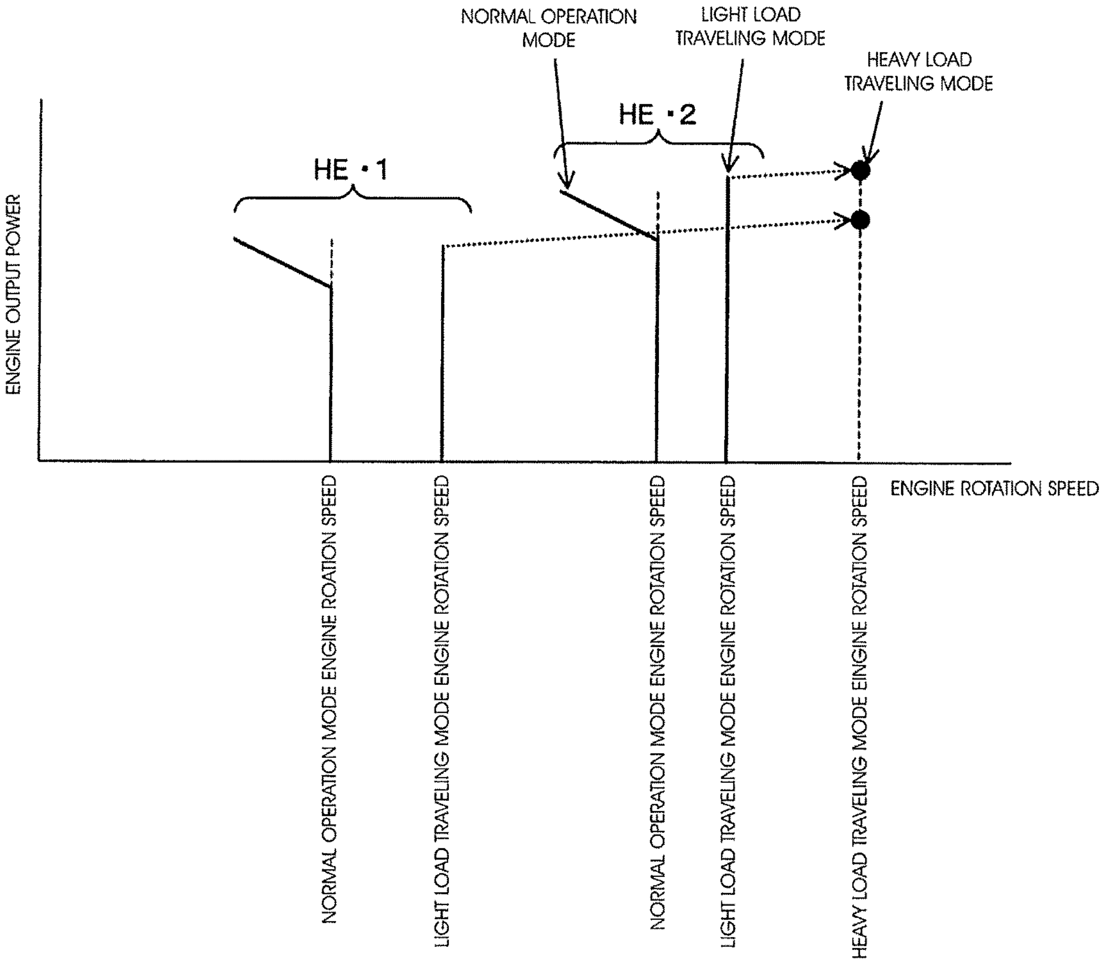
FIG. 1 is a characteristic diagram of an engine rotation speed and an engine output power, illustrating an embodiment of engine control in a working machine according to the present invention.

FIG. 1 is a characteristic diagram illustrating an engine rotation speed and engine output power associated with control of reducing the fuel consumption during the normal operation state in a state (non-traveling state) where the traveling motor 3*m* is stopped and securing a traveling speed and maximum output power in a traveling state.

In the example illustrated in FIG. 1, HE-1 indicates the characteristics of an excavator having relatively low output power, HE-2 indicates the characteristics of an excavator having relatively high output power, and in both excavators, a normal operation mode engine rotation speed during the normal operation state is lower than their rated rotation speed. That is, in order to reduce fuel consumption, the engine rotation speed is suppressed as low as possible. When the engine rotation speed is decreased to the normal operation mode engine rotation speed, the maximum flow rate of the variable displacement pump 11 and the maximum output power of the engine are decreased, which results in reduction in fuel consumption.

Moreover, during a light load state, for example, when the traveling motor 3*m* is operated so that the vehicle body 2 travels straight on a flat ground, the engine rotation speed is controlled such that the pump flow rate is adjusted so as to correspond to a target traveling speed. That is, isochronous control is performed so that the engine rotation speed is increased to a light load traveling mode engine rotation speed in order to secure the traveling speed and the rotation speed is maintained (first step).

In this case, when the engine rotation speed is variably controlled to an appropriate value while maintaining the pump swash plates of the two variable displacement pumps 11 provided so as to correspond to the traveling motors 3*m* on both left and right sides of the vehicle body 2 to their maximum swash angle, the pump flow rates discharged from the variable displacement pumps 11 can be controlled appropriately. Moreover, when the pump swash plates of the variable displacement pumps 11 are maintained to their maximum swash angles, pumping efficiency can be improved. Further, since a state where the pump swash plates reach their physical limits is created, a difference between the pump flow rates of two variable displacement pumps occurs rarely, and the ability to travel straight can be secured.

Further, during a heavy load state where more power than during the light load state is demanded, both an engine rotation speed and a pump control output torque are controlled so that engine output power is maximized. That is, when a travel load increases, the engine rotation speed is changed to a heavy load traveling mode engine rotation speed (second step) in order to increase the upper limit engine output power and the upper limit pump control output power is changed.

In this case, the engine rotation speed is controlled so that the engine rotation speed changes along a hysteresis curve rather than along an oscillatory curve such that the engine rotation speed is changed from the first step to the second step if the pump load pressure during traveling exceeds a first threshold A and the engine rotation speed returns from the second step to the first step if the pump load pressure is lower than a second threshold B, which is lower than the first threshold A.

Figure 2:
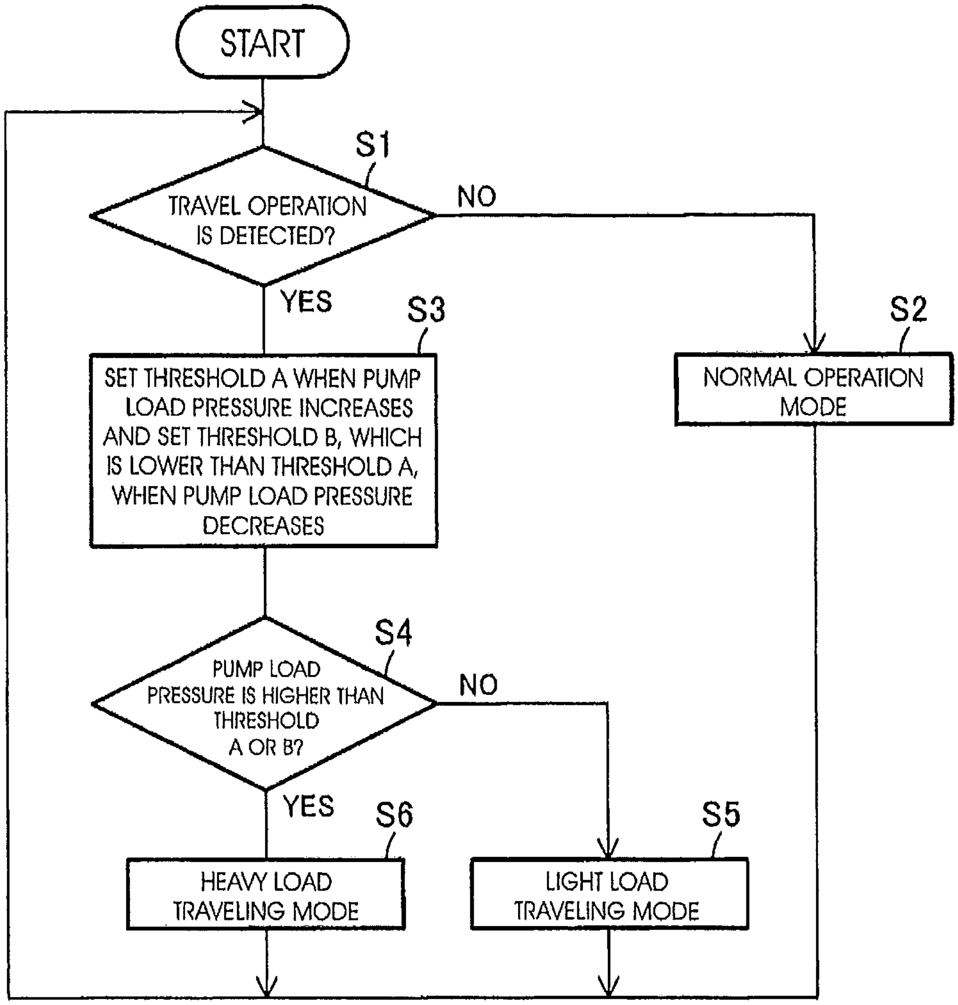
FIG. 2 is a flowchart illustrating how the engine control switches modes.

FIG. 2 is a flowchart illustrating how the controller 22 switches modes, which will be described below.

(Step S1)

It is determined whether a travel operation is detected. The travel operation may be detected by a pressure switch or a pressure sensor detecting a travel pilot pressure of operating a travel control valve or may be detected by a mechanical switch directly detecting the input of a travel lever.

(Step S2)

When the travel operation is not detected, it is determined that the present control mode is a normal operation mode.

(Step S3)

When the travel operation is detected, the pump load pressure detected by the pump pressure sensor 18 is detected. In the case of a travel-only operation, a traveling load pressure detected by a pressure sensor provided in a traveling hydraulic circuit may be used.

When the travel operation is performed, although the present control mode is changed from the normal operation mode to the traveling mode, since two traveling modes of a light load traveling mode and a heavy load traveling mode are present depending on the pump load pressure, a threshold for distinguishing the two modes is determined. In this case, since a system becomes unstable if the measured pump load pressure fluctuates frequently across a threshold, the first and second thresholds A and B having hysteresis characteristics are set.

That is, the controller 22 has the first threshold A at which the engine rotation speed is modified from the light load traveling mode engine rotation speed to the heavy load traveling mode engine rotation speed when the pump load pressure during traveling increases and the second threshold B at which the engine rotation speed is decreased from the heavy load traveling mode engine rotation speed to the light load traveling mode engine rotation speed when the pump load pressure decreases. The controller 22 uses the first threshold A when the pump load pressure increases and uses the second threshold B, which is lower than the first threshold A, when the pump load pressure decreases. In this way, the engine rotation speeds in the rising period and the falling period of the pump load pressure are switched along a hysteresis curve using the two steps of first and second thresholds A and B. Thus, it is possible to prevent oscillatory behavior of the engine rotation speed and to improve stability of control. These thresholds A and B are parameters that can be adjusted depending on model.

(Step S4)

It is determined whether an average pump load pressure detected by the pump pressure sensor 18 and the like is higher than the threshold A or B. That is, it is determined whether the increasing pump load pressure is higher than the first threshold A and whether the decreasing pump load pressure is higher than the second threshold B.

(Step S5)

When the pump load pressure is lower than the threshold A or B, it is determined that the present control mode is a light load traveling mode. That is, when the increasing pump load pressure is lower than the first threshold A or the decreasing pump load pressure is lower than the second threshold B, it is determined that the present control mode is a light load traveling mode.

(Step S6)

When the pump load pressure is higher than the threshold A or B, it is determined that the present control mode is a heavy load traveling mode. That is, when the increasing pump load pressure is higher than the first threshold A or the decreasing pump load pressure is higher than the second threshold B, it is determined that the present control mode is a heavy load traveling mode.

Figure 3:
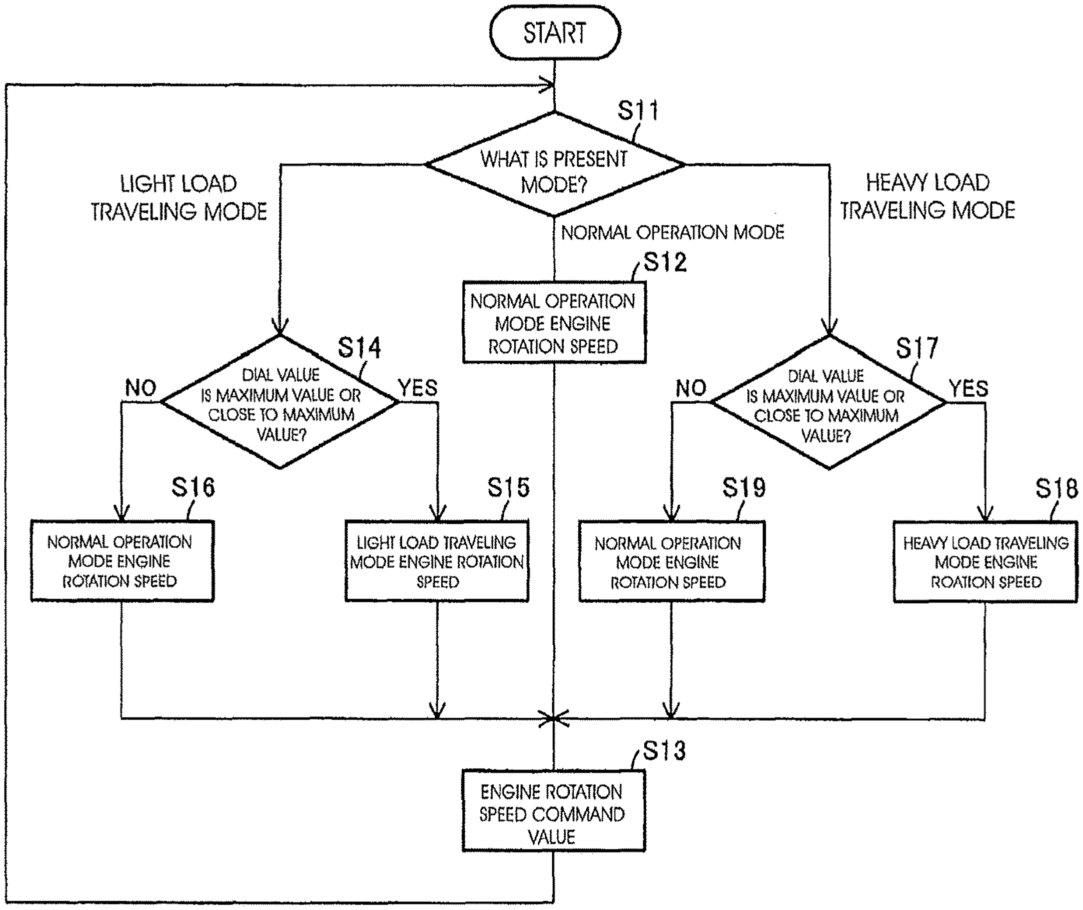
FIG. 3 is a flowchart illustrating how the engine control determines an engine rotation speed command value.

FIG. 3 is a flowchart illustrating how the controller 22 determines an engine rotation speed command value, which will be described below.

An optimal traveling engine rotation speed command value for each of the normal operation mode, the light load traveling mode, and the heavy load traveling mode is provided, and the command value is set as a parameter of each model.

(Step S11)

It is determined whether the present control mode is a normal operation mode, a light load traveling mode, or a heavy load traveling mode.

(Step S12)

When the present control mode is a normal operation mode, the normal operation mode engine rotation speed is determined.

(Step S13)

In the case of step S12, the normal operation mode engine rotation speed is output from the machine controller 19 to the engine controller 15 as an engine rotation speed command value.

(Step S14)

When it is determined in step S11 that the present control mode is a light load traveling mode, it is determined whether the dial value of the dial engine governor 21 is the maximum value or a value close to the maximum value, or is lower than these values. (Step S15)

When it is determined in step S14 that the dial value of the dial engine governor 21 is the maximum value (for example, “10”) or a value (for example, “9” or “8”) close to the maximum value, the light load traveling mode engine rotation speed is determined as the engine rotation speed command value and is output from the machine controller 19 to the engine controller 15. It is assumed that the light load traveling mode engine rotation speed is a value which realizes a target traveling speed.

The light load traveling mode engine rotation speed command value is calculated according to the following equation.

(Target traveling motor rotation speed)×(Traveling motor displacement)=(Traveling flow rate)

(Traveling flow rate)/(Pump flow rate)=(Pump rotation speed)

(Pump rotation speed)/(Engine-pump reduction ratio) =(Engine rotation speed)

(Step S16)

When it is determined in step S14 that the dial value of the dial engine governor 21 is not the maximum value or a value close to the maximum value, mode switching is implemented and then the normal operation mode engine rotation speed is determined as the engine rotation speed command value and is output from the machine controller 19 to the engine controller 15. During the mode switching, a delay circuit or a ramp function for smoothing the control may be used.

(Step S17)

When it is determined in step S11 that the present control mode is a heavy load traveling mode, it is determined whether the dial value of the dial engine governor 21 is the maximum value or a value close to the maximum value, or is lower than these values.

The dial value of the dial engine governor 21 is set such that the “light load traveling mode engine rotation speed” is set as the command value when the dial value is equal to or larger than a predetermined dial value only and the “normal operation mode engine rotation speed” is set as the command value when the dial value is smaller than the predetermined dial value.

(Step S18)

When it is determined in step S17 that the dial value of the dial engine governor 21 is the maximum value (for example, “10”) or a value (for example, “9” or “8”) close to the maximum value, the heavy load traveling mode engine rotation speed is determined as the engine rotation speed command value and is output from the machine controller 19 to the engine controller 15. It is assumed that the heavy load traveling mode engine rotation speed is a value which can use the maximum output power (=(Torque)×(Rotation speed)) on an engine torque curve.

(Step S19)

When it is determined in step S17 that the dial value of the dial engine governor 21 is not the maximum value or a value close to the maximum value, mode switching is implemented and then the normal operation mode engine rotation speed is determined as the engine rotation speed command value and is output from the machine controller 19 to the engine controller 15.

In steps S15 and S16 and steps S18 and S19, when switching the rotation speed command values, a delay circuit or a ramp function for smoothing the control may be used.

Although in steps S14 and S17 of selecting the conditions for the engine rotation speed command value, illustrated in FIG. 3, a case where the dial value of the dial engine governor 21 is set to the maximum value or a value close to the maximum value is distinguished from a case where the dial value is set to a value smaller than these values, such conditional determination may not be performed.

For example, when it is determined in step S11 that the present control mode is the light load traveling mode, the light load traveling mode engine rotation speed only may be determined as the engine rotation speed command value. Moreover, when it is determined in step S11 that the present control mode is the heavy load traveling mode, the heavy load traveling mode engine rotation speed only may be determined as the engine rotation speed command value.

Figure 4:
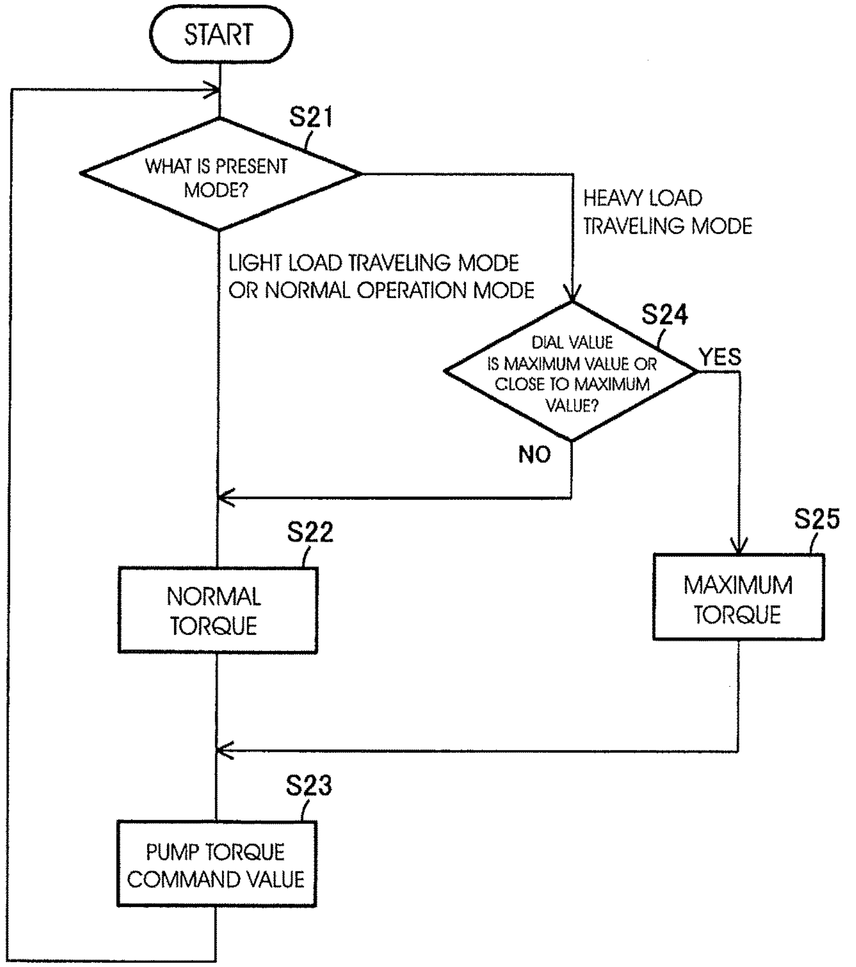
FIG. 4 is a flowchart illustrating how the engine control determines a torque command value.

FIG. 4 is a flowchart illustrating how the controller 22 determines a torque command value, which will be described below.

(Step S21)

It is determined whether the present control mode is a normal operation mode or a light load traveling mode, or a heavy load traveling mode.

(Step S22)

When the present control mode is the normal operation mode or the light load traveling mode, a target pump control torque is determined as a normal torque.

(Step S23)

In the case of step S22, the normal torque is output as a pump torque command value.

(Step S24)

It is determined whether the dial value of the dial engine governor 21 is a maximum value or a value close to the maximum value. When the dial value is smaller than the maximum value or the value close to the maximum value, the heavy load traveling mode is switched to the light load traveling mode or the normal operation mode. During the mode switching, a delay circuit or a ramp function for smoothing the control may be used.

(Step S25)

When the dial value of the dial engine governor 21 is equal to or larger than the maximum value or the value close to the maximum value, a maximum torque is used as a pump torque command value. In short, during the heavy load traveling mode, a target pump control torque is maximized. The maximum torque is set as a parameter of each model.

In step S24, the target pump control torque value may be determined as the maximum torque only when the dial value of the dial engine governor 21 is set to the maximum value "10", and the torque may be switched to the normal torque when the dial value is "9" or smaller. Alternatively, the maximum torque may be determined as the pump torque command value when the dial value is the value "9" close to the maximum value or is "8" or larger, and the torque may be switched to the normal torque when the dial value is smaller than "8" or "7".

Although in steps S24, a case where the dial value of the dial engine governor 21 is set to the maximum value ("10") or a value ("9" or "8") close to the maximum value is distinguished from a case where the dial value is set to a value smaller than these values, such conditional determination of step S24 may not be performed.

For example, when it is determined in step S21 that the present control mode is the heavy load traveling mode, the maximum torque only may be determined as the torque command value.

Next, how the engine rotation speed and torque are controlled in the following three modes depending on an operation state of the excavator will be described.

(1) During Normal Operation (Normal Operation Mode)

Mode switching condition: A state where no travel operation is performed is created (see FIG. 2).

Engine rotation speed: The "normal operation mode engine rotation speed" lower than the rated rotation speed is selected as the engine rotation speed command value (see FIG. 3).

Torque: The "normal torque" lower than the maximum value is selected as the target pump control torque (see FIG. 4). Actually, the engine output power is controlled by controlling the pump torque.

(2) During Light Load (Light Load Traveling Mode)

Mode switching condition: A state where a travel operation is performed is detected and the pump load pressure is lower than the second threshold B (see FIG. 2). Although the pump pressure detected by the pump pressure sensor 18 is used as the pump load pressure, the motor pressure detected by a pressure sensor as another pump load detecting means for detecting the high-pressure-side pressure on a traveling motor circuit may be used.

Engine rotation speed: The "light load traveling mode engine rotation speed" higher than the "normal operation mode engine rotation speed" and lower than "heavy load traveling mode engine rotation speed" is selected as the command value (see FIG. 3). It is assumed that the light load traveling mode engine rotation speed is a value which can realize the target traveling speed (specification value). The maximum speed during the travel operation is always the target traveling speed (specification value).

The dial value of the dial engine governor 21 may be set such that the "light load traveling mode engine rotation speed" is set as the command value when the dial value is equal to or larger than a predetermined dial value only and the "normal operation mode engine rotation speed" defined in (1) is set as the command value when the dial value is smaller than the predetermined dial value (see FIG. 3).

Torque: The "normal torque" lower than the maximum value is selected as the target pump control torque (see FIG. 4).

(3) During Heavy Load (Heavy Load Traveling Mode)

Mode switching condition: A state where a travel operation is performed is detected and the pump load pressure is higher than the first threshold A (see FIG. 2).

Engine rotation speed: The "heavy load traveling mode engine rotation speed" higher than the "normal operation mode engine rotation speed" and the "light load traveling mode engine rotation speed" is selected as the command value (see FIG. 3). The heavy load traveling mode engine rotation speed is a rotation speed value at which the maximum output power on an engine torque curve is obtained.

The dial value of the dial engine governor 21 may be set such that the "heavy load traveling mode engine rotation speed" is set as the command value when the dial value is equal to or larger than a predetermined dial value only and the "normal operation mode engine rotation speed" defined in (1) is set as the command value when the dial value is smaller than the predetermined dial value (see FIG. 3).

Torque: The "maximum torque" is selected as the target pump control torque (see FIG. 4). A value unique to each model is set as the target torque.

The dial value of the dial engine governor 21 may be set such that the target torque is set to the maximum value when the dial value is equal to or larger than a predetermined dial value only and the normal torque defined in (1) is set as the command value when the dial value is smaller than the predetermined dial value (see FIG. 4).

Here, if only one threshold is used rather than using different thresholds A and B, when the pump load pressure is near the threshold, the control mode may switch continuously between the two modes (2) and (3) in a short period of time and the engine rotation speed may fluctuate and exhibit oscillatory behavior. In order to prevent this, the threshold of the pump load pressure has hysteresis characteristics such that the first threshold A associated with the pump load pressure when the control mode switches from the mode (2) to the mode (3) and the second threshold B associated with the pump load pressure when the control mode switches from the mode (3) to the mode (2) is set to be lower than the first threshold A.

As described above, in the excavator 1 in which the working unit 5 operated by the working hydraulic actuators 5*m*, 5*a*, 5*b*, and 5*c* is mounted on the vehicle body 2 having the traveling motor 3*m*, the controller 22 decreases the engine rotation speed to be lower than the rated rotation speed during the normal operation state, controls the engine rotation speed so that the pump flow rate is adjusted so as to correspond to the target traveling speed during the light load state, and controls the engine rotation speed and the pump control output torque so that the engine output power is maximized during the heavy load state. Thus, during the normal operation state, it is possible to reduce the fuel consumption by decreasing the engine rotation speed. During the light load state, it is possible to secure a predetermined traveling speed by adjusting the pump flow rate so as to correspond to the target traveling speed. Further, in the heavy load, the engine output power is maximized by controlling the engine rotation speed and the pump control output torque. Therefore, it is possible to secure the traveling speed and the output power under severe traveling conditions such as during traveling on slope lane or during spin-turning. As a result, it is possible to reduce the fuel consumption during the normal operation state of the excavator 1 and to secure the traveling speed and the output power under severe traveling conditions.

Moreover, the normal operation mode during the normal operation state where the vehicle stops traveling, the light load traveling mode during the light load state, and the heavy load traveling mode during the heavy load state are selected depending on the operation state of the excavator 1, and different combinations of the engine rotation speed and the target pump control torque are selected for respective modes to control the engine rotation speed and the torque. Therefore, the control ideal for each mode can be performed easily, and it is possible to reduce the fuel consumption during the normal operation state and to secure the traveling performance.

INDUSTRIAL APPLICABILITY

The present invention is industrially applicable to business operators associated with manufacturing and selling working machines.

EXPLANATION OF REFERENCE NUMERALS

1: Excavator as working machine
2: Vehicle body
3*m*: Traveling hydraulic pressure motor (Traveling motor)
5: Working unit
5*m*, 5*a*, 5*b*, 5*c*: Working hydraulic actuator as working hydraulic pressure actuator
11: Hydraulic pressure pump (Variable displacement pump)
12: Engine
22: Controller

The invention claimed is:

1. A working machine comprising:

a vehicle body having right and left sides, the vehicle body including a travelling hydraulic pressure motor on each of the left and right sides of the vehicle body, the vehicle body traveling using the traveling hydraulic pressure motors;

a working unit that includes a working hydraulic pressure actuator and is mounted on the vehicle body operated by the working hydraulic pressure actuator;

an engine that is mounted on the vehicle body;

a plurality of variable displacement hydraulic pressure pumps corresponding to the traveling hydraulic pressure motors, each of the plurality of variable displacement hydraulic pressure pumps including a pump swash plate as displacement varying means, the plurality of variable displacement pumps driven by the engine so as to supply an operating fluid to the traveling hydraulic pressure motors and the working hydraulic pressure actuator; and a controller that decreases an engine rotation speed to be lower than a rated rotation speed during a normal operation state in a state where the traveling hydraulic pressure motors are stopped, that controls the engine rotation speed so that a pump flow rate is adjusted corresponding to a target traveling speed during a light load state where an engine load generated when operating the traveling hydraulic pressure motors is lower than a threshold, and that controls the engine rotation speed and a pump control output torque so that engine output power is increased from that during the normal operation state and the light load, during a heavy load state where the engine load is higher than the threshold, wherein the controller maintains the pump swash plate of each of the plurality of variable displacement pumps during traveling at a maximum swash plate angle and variable controls the engine rotation speed.

2. The working machine according to claim 1, wherein the controller has:

a normal operation mode where during the normal operation state, a normal operation mode engine rotation speed, which is lower than the rated rotation speed, is selected as an engine rotation speed command value and a normal torque is selected as a target pump control torque;

a light load traveling mode where during the tight load state, a light load traveling mode engine rotation speed, which is different from the normal operation mode engine rotation speed, is selected as the engine rotation speed command value and the normal torque is selected as the target pump control torque; and a heavy load traveling mode where during the heavy load state, a heavy load traveling mode engine rotation speed, which is higher than the normal operation mode engine rotation speed, is selected as the engine rotation speed command value and a torque increased from the normal torque of the normal operation mode and the light load traveling mode is selected as the target pump control torque.

3. The working machine according to claim 2, wherein the controller has:

a first threshold for changing the engine rotation speed from a light load traveling mode engine rotation speed to a heavy load traveling mode engine rotation speed when the engine load during traveling increases; and a second threshold, which is lower than the first threshold, for controlling to return the engine rotation speed from the heavy load traveling mode engine rotation speed to the light load traveling mode engine rotation speed when the engine load decreases.

4. The working machine according to claim 3, wherein the engine load is determined based on at least one of measured amounts of a pump load pressure discharged from the hydraulic pressure pump, a traveling load pressure applied to the traveling hydraulic pressure motor, a fuel discharge amount of the engine, and a cylinder internal pressure of the engine, or the fuel discharge amount and the rotation speed of the engine.

5. The working machine according to claim 2, wherein the engine load is determined based on at least one of measured amounts of a pump load pressure discharged from the hydraulic pressure pump, a traveling load pressure applied to the traveling hydraulic pressure motor, a fuel discharge amount of the engine, and a cylinder internal pressure of the engine, or the fuel discharge amount and the rotation speed of the engine.

6. The working machine according to claim 1, wherein the engine load is determined based on at least one of measured amounts of a pump load pressure discharged from the hydraulic pressure pump, a traveling load pressure applied to the traveling hydraulic pressure motor, a fuel discharge amount of the engine, and a cylinder internal pressure of the engine, or the fuel discharge amount and the rotation speed of the engine.

7. The working machine according to claim 1, wherein the controller has:

a first threshold for changing the engine rotation speed from a light load traveling mode engine rotation speed to a heavy load traveling mode engine rotation speed when the engine load during traveling increases; and a second threshold, which is lower than the first threshold, for controlling to return the engine rotation speed from the heavy load traveling mode engine rotation speed to the light load traveling mode engine rotation speed when the engine load decreases.

8. The working machine according to claim 7, wherein the engine load is determined based on at least one of measured amounts of a pump load pressure discharged from the hydraulic pressure pump, a traveling load pressure applied to the traveling hydraulic pressure motor, a fuel discharge amount of the engine, and a cylinder internal pressure of the engine, or the fuel discharge amount and the rotation speed of the engine.

9. The working machine according to claim 1, wherein the controller has:

a first threshold for changing the engine rotation speed from a light load traveling mode engine rotation speed to a heavy load traveling mode engine rotation speed when the engine load during traveling increases; and a second threshold, which is lower than the first threshold, for controlling to return the engine rotation speed from the heavy load traveling mode engine rotation speed to the light load traveling mode engine rotation speed when the engine load decreases.

10. The working machine according to claim 9, wherein the engine load is determined based on at least one of measured amounts of a pump load pressure discharged from the hydraulic pressure pump, a traveling load pressure applied to the traveling hydraulic pressure motor, a fuel discharge amount of the engine, and a cylinder internal pressure of the engine, or the fuel discharge amount and the rotation speed of the engine.

11. The working machine according to claim 1, wherein the engine load is determined based on at least one of measured amounts of a pump load pressure discharged from the hydraulic pressure pump, a traveling load pressure applied to the traveling hydraulic pressure motor, a fuel discharge amount of the engine, and a cylinder internal pressure of the engine, or the fuel discharge amount and the rotation speed of the engine.

12. The working machine according to claim 1, wherein the engine load is determined based on at least one of measured amounts of a pump load pressure discharged from the hydraulic pressure pump, a traveling load pressure applied to the traveling hydraulic pressure motor, a fuel discharge amount of the engine, and a cylinder internal pressure of the engine, or the fuel discharge amount and the rotation speed of the engine.

* * * * *